(12) United States Patent
Trombetta et al.

(10) Patent No.: US 11,452,943 B2
(45) Date of Patent: Sep. 27, 2022

(54) DISCOVERY AND DETECTION OF EVENTS IN INTERACTIVE CONTENT

(71) Applicant: SONY INTERACTIVE ENTERTAINMENT LLC, San Mateo, CA (US)

(72) Inventors: Steven Trombetta, San Mateo, CA (US); Christopher Thielbar, San Francisco, CA (US); James Fairbairn, Novato, CA (US)

(73) Assignee: SONY INTERACTIVE ENTERTAINMENT LLC, San Mateo, CA (US)

( * ) Notice: Subject to any disclaimer, the term of this patent is extended or adjusted under 35 U.S.C. 154(b) by 0 days.

(21) Appl. No.: 17/060,458

(22) Filed: Oct. 1, 2020

(65) Prior Publication Data
US 2021/0016190 A1 Jan. 21, 2021

Related U.S. Application Data

(63) Continuation of application No. 15/908,712, filed on Feb. 28, 2018, now Pat. No. 10,792,577.

(51) Int. Cl.
*A63F 13/34* (2014.01)
*A63F 13/86* (2014.01)
(Continued)

(52) U.S. Cl.
CPC ............ *A63F 13/86* (2014.09); *A63F 13/798* (2014.09); *A63F 13/32* (2014.09); *A63F 13/33* (2014.09);
(Continued)

(58) Field of Classification Search
CPC ........ A63F 13/86; A63F 13/798; A63F 13/32; A63F 13/33; A63F 2300/556; A63F 2300/558; A63F 2300/577
See application file for complete search history.

(56) References Cited

U.S. PATENT DOCUMENTS 5,729,471 A 3/1998 Jain et al.
5,995,518 A 11/1999 Burns et al.
(Continued)

FOREIGN PATENT DOCUMENTS

CN 110201395 A 9/2019
CN 110201398 A 9/2019
(Continued)

OTHER PUBLICATIONS

NAHL ranked #1 by The Junior Hockey News_North American Hockey League_NAHL.pdf, http://nahl.com/news/story.cfm?id=15090, Jul. 16, 2015 (Year: 2015).
(Continued)

*Primary Examiner* — David L Lewis
*Assistant Examiner* — Shauna-Kay Hall
(74) *Attorney, Agent, or Firm* — Polsinelli LLP (57) ABSTRACT

A plurality of game titles may be hosted on a gaming network platform, and gameplay data in sessions involving the game titles may be tracked in real-time. Each session may be associated with a stream. One or more event criteria may be stored for each of a plurality of predefined events of interest. An event of interest may be identified when the tracked gameplay data for a session meets the stored criteria. A list of available streams identified as including the identified event may be sorted, and a subset of the available streams may be identified as being at a top of the list. A notification may be provided to a spectator device that includes a link to one of the streams in the subset. The criteria for the event of interest may also be updated based on subsequent game data and feedback (e.g., use of the link).

19 Claims, 4 Drawing Sheets

(51) Int. Cl.
　　　A63F 13/798　　(2014.01)
　　　A63F 13/32　　(2014.01)
　　　A63F 13/33　　(2014.01)
(52) U.S. Cl.
　　　CPC ... *A63F 2300/556* (2013.01); *A63F 2300/558* (2013.01); *A63F 2300/577* (2013.01)

(56) References Cited

U.S. PATENT DOCUMENTS

| | | |
|---|---|---|
| 6,415,317 B1 | 7/2002 | Yelon et al. |
| 6,546,421 B1 | 4/2003 | Wynblatt et al. |
| 6,631,522 B1 | 10/2003 | Erdelyi |
| 6,877,134 B1 | 4/2005 | Fuller et al. |
| 7,499,475 B2 | 3/2009 | Kashiwagi et al. |
| 8,025,572 B2 | 9/2011 | Spanton et al. |
| 8,187,104 B2 | 5/2012 | Pearce |
| 8,202,167 B2 | 6/2012 | Ackely et al. |
| 8,645,844 B1 | 2/2014 | Strobel et al. |
| 8,702,520 B2 | 4/2014 | Seelig et al. |
| 9,216,356 B2 | 12/2015 | Grier |
| 9,233,305 B2 | 1/2016 | Laakkonen et al. |
| 9,433,855 B1 | 9/2016 | Keeker et al. |
| 9,473,825 B2 | 10/2016 | Gossweiler et al. |
| 9,479,602 B1 | 10/2016 | Paradise et al. |
| 9,497,424 B2 | 11/2016 | Kosseifi et al. |
| 9,782,678 B2 | 10/2017 | Long et al. |
| 9,814,987 B1 | 11/2017 | Lawson |
| 9,860,477 B2 | 1/2018 | Kummer et al. |
| 9,871,997 B2 | 1/2018 | Kosseifi et al. |
| 9,968,856 B1 | 5/2018 | Ninoles et al. |
| 10,277,813 B1 | 4/2019 | Thomas et al. |
| 10,471,360 B2 | 11/2019 | Trombetta |
| 10,751,623 B2 | 8/2020 | Trombetta |
| 10,765,938 B2 | 9/2020 | Trombetta |
| 10,765,957 B2 | 9/2020 | Trombetta |
| 10,792,576 B2 | 10/2020 | Trombetta |
| 10,792,577 B2 | 10/2020 | Trombetta |
| 10,814,228 B2 | 10/2020 | Trombetta |
| 10,818,142 B2 | 10/2020 | Trombetta |
| 10,953,322 B2 | 3/2021 | Trombetta |
| 10,953,335 B2 | 3/2021 | Thielbar |
| 11,065,548 B2 | 7/2021 | Trombetta |
| 11,241,630 B2 | 2/2022 | Trombetta |
| 2002/0034980 A1 | 3/2002 | Lemmons et al. |
| 2002/0107040 A1 | 8/2002 | Crandall et al. |
| 2003/0177347 A1 | 9/2003 | Schneier et al. |
| 2003/0220143 A1 | 11/2003 | Shteyn et al. |
| 2004/0147306 A1 | 7/2004 | Randall et al. |
| 2004/0189701 A1 | 9/2004 | Badt |
| 2004/0257994 A1 | 12/2004 | Paskett et al. |
| 2004/0266535 A1 | 12/2004 | Reeves |
| 2005/0020359 A1 | 1/2005 | Ackely et al. |
| 2005/0026699 A1 | 2/2005 | Kinzer et lal. |
| 2006/0105827 A1 | 5/2006 | Metzger et al. |
| 2006/0247060 A1 | 11/2006 | Hanson et al. |
| 2006/0287096 A1 | 12/2006 | O'Kelley et al. |
| 2007/0018952 A1 | 1/2007 | Arseneau et al. |
| 2007/0021058 A1 | 1/2007 | Aresneau et al. |
| 2007/0070914 A1 | 3/2007 | Abigail |
| 2007/0117617 A1 | 5/2007 | Spanton et al. |
| 2007/0117635 A1 | 5/2007 | Spanton et al. |
| 2007/0149288 A1 | 6/2007 | Nickell et al. |
| 2007/0191102 A1 | 8/2007 | Coliz et al. |
| 2007/0248261 A1 | 10/2007 | Zhou et al. |
| 2008/0079752 A1 | 4/2008 | Gates et al. |
| 2008/0113815 A1 | 5/2008 | Weingardt et al. |
| 2008/0119286 A1 | 5/2008 | Brunstetter et al. |
| 2008/0200254 A1 | 8/2008 | Cayce et al. |
| 2009/0036214 A1 | 2/2009 | Dahl |
| 2009/0042646 A1 | 2/2009 | Sarkar et al. |
| 2009/0082110 A1 | 3/2009 | Relyea et al. |
| 2009/0144448 A1 | 6/2009 | Smith |
| 2009/0208181 A1 | 8/2009 | Cottrell |
| 2009/0225828 A1 | 9/2009 | Perlman et al. |
| 2009/0271821 A1 | 10/2009 | Zalewski |
| 2010/0099330 A1 | 4/2010 | Digiovanni |
| 2010/0100512 A1 | 4/2010 | Brodin et al. |
| 2010/0240443 A1 | 9/2010 | Baerlocher et al. |
| 2011/0092282 A1 | 4/2011 | Gary |
| 2011/0207523 A1 | 8/2011 | Filipour et al. |
| 2011/0250939 A1 | 10/2011 | Hobler |
| 2011/0263332 A1 | 10/2011 | Mizrachi |
| 2011/0263333 A1 | 10/2011 | Dokei et al. |
| 2011/0275431 A1 | 11/2011 | Hirzel et al. |
| 2012/0093481 A1 | 4/2012 | McDowell et al. |
| 2012/0142411 A1 | 6/2012 | Thompson et al. |
| 2012/0283017 A1 | 11/2012 | Ahiska et al. |
| 2013/0002949 A1 | 1/2013 | Raveendran et al. |
| 2013/0007013 A1 | 1/2013 | Geisner et al. |
| 2013/0083173 A1 | 4/2013 | Geisner et al. |
| 2013/0123019 A1 | 5/2013 | Sullivan et al. |
| 2013/0231189 A1 | 9/2013 | Beeler |
| 2013/0254680 A1 | 9/2013 | Buhr et al. |
| 2013/0296051 A1 | 11/2013 | Gault et al. |
| 2013/0324239 A1 | 12/2013 | Ur et al. |
| 2013/0331192 A1 | 12/2013 | Betti et al. |
| 2014/0004951 A1 | 1/2014 | Kern et al. |
| 2014/0031121 A1 | 1/2014 | Kern et al. |
| 2014/0087846 A1 | 3/2014 | Bryan et al. |
| 2014/0087851 A1 | 3/2014 | Low et al. |
| 2014/0113718 A1 | 4/2014 | Norman et al. |
| 2014/0142921 A1 | 5/2014 | Gleadall et al. |
| 2014/0171039 A1 | 6/2014 | Bjontegard |
| 2014/0171182 A1 | 6/2014 | Versaci |
| 2014/0179440 A1 | 6/2014 | Perry |
| 2014/0228112 A1 | 8/2014 | Laakkonen et al. |
| 2014/0274307 A1 | 9/2014 | Gonzalez |
| 2014/0274368 A1 | 9/2014 | Cotter |
| 2014/0274370 A1 | 9/2014 | Shah |
| 2014/0297408 A1 | 10/2014 | Zabala |
| 2014/0331265 A1 | 11/2014 | Mozell et al. |
| 2015/0005052 A1 | 1/2015 | Harrington et al. |
| 2015/0011283 A1 | 1/2015 | Sanford et al. |
| 2015/0018990 A1 | 1/2015 | Shachar et al. |
| 2015/0024850 A1 | 1/2015 | Kokami et al. |
| 2015/0113548 A1 | 4/2015 | Stern et al. |
| 2015/0141140 A1 | 5/2015 | Lampe et al. |
| 2015/0238859 A1 | 8/2015 | Fear |
| 2015/0248792 A1 | 9/2015 | Abovitz et al. |
| 2015/0281029 A1 | 10/2015 | Callahan et al. |
| 2015/0348373 A1 | 12/2015 | Weingardt et al. |
| 2015/0375117 A1 | 12/2015 | Thompson et al. |
| 2016/0051895 A1 | 2/2016 | Hood |
| 2016/0193530 A1 | 7/2016 | Parker et al. |
| 2016/0214012 A1 | 7/2016 | Nishikawa |
| 2016/0243450 A1 | 8/2016 | Cotter |
| 2016/0253865 A1 | 9/2016 | Men et al. |
| 2016/0286244 A1 | 9/2016 | Chang et al. |
| 2016/0310843 A1 | 10/2016 | Webb |
| 2016/0365121 A1 | 12/2016 | DeCaprio |
| 2016/0373499 A1 | 12/2016 | Wagner et al. |
| 2017/0001111 A1 | 1/2017 | Willette et al. |
| 2017/0001112 A1 | 1/2017 | Gilmore et al. |
| 2017/0003740 A1 | 1/2017 | Verfaillie et al. |
| 2017/0003784 A1 | 1/2017 | Garg et al. |
| 2017/0006074 A1 | 1/2017 | Oates |
| 2017/0072324 A1 | 3/2017 | Navok et al. |
| 2017/0113143 A1 | 4/2017 | Marr |
| 2017/0157512 A1 | 6/2017 | Long et al. |
| 2017/0182426 A1 | 6/2017 | Loeb et al. |
| 2017/0209795 A1 | 7/2017 | Harvey et al. |
| 2017/0266549 A1 | 9/2017 | Paradise |
| 2017/0266552 A1 | 9/2017 | Paradise et al. |
| 2017/0270751 A1 | 9/2017 | Paradise |
| 2017/0282075 A1 | 10/2017 | Michot et al. |
| 2017/0282082 A1 | 10/2017 | Hubbard |
| 2017/0304724 A1 | 10/2017 | Cotter |
| 2017/0332131 A1 | 11/2017 | Opsenica et al. |
| 2017/0354875 A1 | 12/2017 | Marks et al. |
| 2017/0374402 A1 | 12/2017 | Pogorelik et al. |
| 2018/0001199 A1 | 1/2018 | Gary |
| 2018/0077438 A1 | 3/2018 | Hensen et al. |
| 2018/0139257 A1 | 5/2018 | Ninoles et al. |
| 2018/0167656 A1 | 6/2018 | Ortiz et al. |

(56) References Cited

U.S. PATENT DOCUMENTS

| | | | |
|---|---|---|---|
| 2018/0192144 | A1 | 7/2018 | McElroy |
| 2018/0250598 | A1 | 9/2018 | Trombetta |
| 2018/0250600 | A1 | 9/2018 | Trombetta |
| 2018/0367820 | A1 | 12/2018 | Abulikemu |
| 2019/0099675 | A1 | 4/2019 | Khan et al. |
| 2019/0102941 | A1 | 4/2019 | Khan et al. |
| 2019/0118098 | A1 | 4/2019 | Payzer et al. |
| 2019/0262705 | A1 | 8/2019 | Trombetta |
| 2019/0262706 | A1 | 8/2019 | Trombetta |
| 2019/0262712 | A1 | 8/2019 | Trombetta |
| 2019/0262713 | A1 | 8/2019 | Trombetta |
| 2019/0262717 | A1 | 8/2019 | Thielbar |
| 2019/0262720 | A1 | 8/2019 | Trombetta |
| 2019/0262723 | A1 | 8/2019 | Trombetta |
| 2019/0262724 | A1 | 8/2019 | Trombetta |
| 2019/0262727 | A1 | 8/2019 | Trombetta |
| 2019/0266845 | A1 | 8/2019 | Trombetta |
| 2020/0179812 | A1 | 6/2020 | Trombetta |
| 2020/0384364 | A1 | 12/2020 | Trombetta |
| 2020/0398157 | A1 | 12/2020 | Trombetta |
| 2020/0398169 | A1 | 12/2020 | Trombetta |
| 2020/0406152 | A1 | 12/2020 | Trombetta |
| 2021/0043044 | A1 | 2/2021 | Trombetta |
| 2021/0052982 | A1 | 2/2021 | Trombetta |
| 2021/0178257 | A1 | 6/2021 | Trombetta |
| 2021/0205711 | A1 | 7/2021 | Thielbar |
| 2021/0346809 | A1 | 11/2021 | Trombetta |

FOREIGN PATENT DOCUMENTS

| | | |
|---|---|---|
| CN | 110201399 A | 9/2019 |
| CN | 110201401 A | 9/2019 |
| CN | 110201402 A | 9/2019 |
| CN | 110201404 A | 9/2019 |
| CN | 110573221 A | 12/2019 |
| CN | 111971097 A | 11/2020 |
| CN | 112423854 A | 2/2021 |
| CN | 112423855 A | 2/2021 |
| CN | 112543669 A | 3/2021 |
| EP | 3 058 996 | 8/2016 |
| EP | 3 758 814 | 1/2021 |
| EP | 3 758 816 | 1/2021 |
| EP | 3 758 818 | 1/2021 |
| EP | 3 758 819 | 1/2021 |
| EP | 3 758 821 | 1/2021 |
| EP | 3 759 930 | 1/2021 |
| EP | 3 759 934 | 1/2021 |
| EP | 3 758 820 | 2/2021 |
| JP | 2021-514748 | 6/2021 |
| JP | 2021-514749 | 6/2021 |
| JP | 2021-514750 | 6/2021 |
| JP | 2021-514751 | 6/2021 |
| JP | 2021-514752 | 6/2021 |
| JP | 2021-514753 | 6/2021 |
| JP | 2021-514754 | 6/2021 |
| JP | 2021-515485 | 6/2021 |
| JP | 2021-516087 | 7/2021 |
| JP | 2021-516088 | 7/2021 |
| KR | 10-2020-0126975 | 11/2020 |
| KR | 10-2020-0127169 | 11/2020 |
| KR | 10-2020-0127172 | 11/2020 |
| KR | 10-2020-0127173 | 11/2020 |
| KR | 10-2020-0128523 | 11/2020 |
| KR | 10-2020-0135946 | 12/2020 |
| KR | 10-2020-0136894 | 12/2020 |
| WO | WO 2010/030313 | 3/2010 |
| WO | WO 2014/109435 | 7/2014 |
| WO | WO 2016/048204 | 3/2016 |
| WO | WO 2016/201333 | 12/2016 |
| WO | WO 2017/004433 | 1/2017 |
| WO | WO 2018/004812 | 1/2018 |
| WO | WO 2018/160274 | 9/2018 |
| WO | WO 2018/165191 | 9/2018 |
| WO | WO 2019/168614 | 9/2019 |
| WO | WO 2019/168615 | 9/2019 |
| WO | WO 2019/168619 | 9/2019 |
| WO | WO 2019/168620 | 9/2019 |
| WO | WO 2019/168630 | 9/2019 |
| WO | WO 2019/168631 | 9/2019 |
| WO | WO 2019/168636 | 9/2019 |
| WO | WO 2019/168637 | 9/2019 |
| WO | WO 2019/168638 | 9/2019 |
| WO | WO 2019/168646 | 9/2019 |

OTHER PUBLICATIONS

PCT Application No. PCT/US2018/013378 International Preliminary Report On Patentability dated Sep. 3, 2019.
PCT Application No. PCT/US2018/013378 International Search Report and Written Opinion dated Mar. 8, 2018.
PCT Application No. PCT/US2018/021197 International Preliminary Report on Patentability dated Sep. 10, 2020.
PCT Application No. PCT/US2018/021197 International Search Report and Written Opinion dated May 30, 2018.
PCT Application No. PCT/US2019/015120 International Preliminary Report on Patentability dated Sep. 1, 2020.
PCT Application No. PCT/US2019/015120 International Search Report and Written Opinion dated Apr. 15, 2019.
PCT Application No. PCT/US2019/015273 International Preliminary Report on Patentability dated Sep. 1, 2020.
PCT Application No. PCT/US2019/015273 International Search Report and Written Opinion dated Apr. 23, 2019.
PCT Application No. PCT/US2019/015124 International Preliminary Report on Patentability dated Sep. 1, 2020.
PCT Application No. PCT/US2019/015124 International Search Report and Written Opinion dated Apr. 15, 2019.
PCT Application No. PCT/US2019/015275 International Preliminary Report on Patentability dated Sep. 1, 2020.
PCT Application No. PCT/US2019/015275 International Search Report and Written Opinion dated Apr. 23, 2019.
PCT Application No. PCT/US2019/016167 International Preliminary Report on Patentability dated Sep. 1, 2020.
PCT Application No. PCT/US2019/016167 International Search Report and Written Opinion dated Aug. 26, 2019.
PCT Application No. PCT/US2019/016180 International Preliminary Report on Patentability dated Sep. 1, 2020.
PCT Application No. PCT/US2019/016180 International Search Report and Written Opinion dated Apr. 23, 2019.
PCT Application No. PCT/US2019/016686 International Preliminary Report on Patentability dated Sep. 1, 2020.
PCT Application No. PCT/US2019/016686 International Search Report and Written Opinion dated Apr. 10, 2019.
PCT Application No. PCT/US2019/016698 International Preliminary Report on Patentability dated Sep. 1, 2020.
PCT Application No. PCT/US2019/016698 International Search Report and Written Opinion dated Apr. 11, 2019.
PCT Application No. PCT/US2019/016694 International Preliminary Report on Patentability dated Sep. 1, 2020.
PCT Application No. PCT/US2019/016694 International Search Report and Written Opinion dated Apr. 15, 2019.
PCT Application No. PCT/US2019/017100 International Preliminary Report on Patentability dated Sep. 1, 2020.
PCT Application No. PCT/US2019/017100 International Search Report and Written Opinion dated Apr. 17, 2019.
U.S. Appl. No. 15/448,356 Final Office Action dated Oct. 21, 2020.
U.S. Appl. No. 15/448,356 Office Action dated May 28, 2020.
U.S. Appl. No. 15/448,356 Final Office Action dated Aug. 6, 2019.
U.S. Appl. No. 15/448,356 Office Action dated Jan. 8, 2019.
U.S. Appl. No. 15/448,356 Final Office Action dated Aug. 31, 2018.
U.S. Appl. No. 15/448,356 Office Action dated Mar. 5, 2018.
U.S. Appl. No. 15/450,602 Final Office Action dated Nov. 2, 2018.
U.S. Appl. No. 15/450,602 Office Action dated Apr. 6, 2018.
U.S. Appl. No. 16/681,477 Office Action dated Apr. 16, 2020.
U.S. Appl. No. 15/908,569 Office Action dated Mar. 27, 2020.
U.S. Appl. No. 15/908,569 Office Action dated Jun. 28, 2019.
U.S. Appl. No. 15/908,722 Office Action dated Oct. 30, 2020.
U.S. Appl. No. 15/908,722 Final Office Action dated Jun. 12, 2020.
U.S. Appl. No. 15/908,722 Office Action dated Jun. 28, 2019.

(56) References Cited

OTHER PUBLICATIONS

U.S. Appl. No. 15/908,635 Office Action dated Jun. 28, 2019.
U.S. Appl. No. 15/908,531 Office Action dated Jun. 28, 2019.
U.S. Appl. No. 15/908,657 Office Action dated Jun. 28, 2019.
U.S. Appl. No. 15/908,438 Office Action dated Oct. 3, 2019.
U.S. Appl. No. 15/908,345 Office Action dated Jan. 10, 2020.
U.S. Appl. No. 15/908,704 Final Office Action dated Jun. 12, 2020.
U.S. Appl. No. 15/908,704 Office Action dated Jun. 28, 2019.
U.S. Appl. No. 15/908,712 Office Action dated Aug. 8, 2019.
U.S. Appl. No. 15/908,707 Final Office Action dated Nov. 18, 2019.
U.S. Appl. No. 15/908,707 Office Action dated Jul. 17, 2019.
U.S. Appl. No. 15/448,356 Final Office Action dated Jul. 28, 2021.
Application No. 19761465.4 Extended European Search Report dated Sep. 1, 2021.
Application No. 19761341.7 Extended European Search Report dated Aug. 17, 2021.
Application No. 19761523.0 Extended European Search Report dated Aug. 12, 2021.
Application No. 202027037125 First Examination Report dated Aug. 5, 2021.
Application No. 19760493.7 Extended European Search Report dated Sep. 2, 2021.
Application No. 18763374.8, Extended European Search Report dated Dec. 14, 2020.
U.S. Appl. No. 16/681,477 Final Office Action dated Nov. 30, 2020.
U.S. Appl. No. 17/207,679, filed Mar. 21, 2021, Christopher Thielbar, Online Tournament Integration.
U.S. Appl. No. 17/188,544, filed Mar. 1, 2021, Steven Trombetta, Scaled VR Engagement and Views in an E-Sports Event.
U.S. Appl. No. 15/448,356 Office Action dated Apr. 12, 2021.
U.S. Appl. No. 16/681,477 Office Action dated Mar. 19, 2021.
U.S. Appl. No. 17/080,551, filed Oct. 26, 2020, Steven Trombetta, Statistically Defined Game Channels.
U.S. Appl. No. 17/014,149, filed Sep. 8, 2020, Steven Trombetta, Integrating Commentary Content and Gameplay Content Over a Multi-User Platform.
U.S. Appl. No. 17/014,182, filed Sep. 8, 2020, Steven Trombetta, De-Interleaving Gameplay Data.
U.S. Appl. No. 17/000,841, filed Aug. 24, 2020, Steven Trombetta, Incentivizing Players to Engage in Competitive Gameplay.
U.S. Appl. No. 17/015,845, filed Sep. 9, 2020, Steven Trombetta, Player to Spectator and Other Spectator Controls.
U.S. Appl. No. 17/080,580, filed Oct. 26, 2020, Steven Trombetta, Creatioin of Winner Tournaments With Fandom Influence.
U.S. Appl. No. 17/014,149 Office Action dated Sep. 29, 2021.
U.S. Appl. No. 17/014,182 Office Action dated Sep. 29, 2021.
U.S. Appl. No. 17/000,841 Office Action dated Sep. 20, 2021.
U.S. Appl. No. 17/015,845 Office Action dated Oct. 6, 2021.
Dietrich et al., Carlos; "Baseball4D: A tool for baseball game reconstruction & visualization", 2014 IEEE Conference on Visual Analytics Science and Technology (VAST), IEEE, Oct. 25, 2014, pp. 23-32.
Application No. 19760732.8 Extended European Search Report dated Oct. 1, 2021.
Application No. 10-2019-7029332 Office Action dated Oct. 19, 2021.
Application No. 19760888.8 Extended European Search Report dated Oct. 27, 2021.
Application No. 19760016.6 Extended European Search Report dated Oct. 8, 2021.
Application No. 19759929.3 Extended European Search Report dated Oct. 25, 2021.
Application No. 19760240.2 Partial Supplementary European Search Report dated Oct. 13, 2021.
Application No. 19760890.4 Extended European Search Report dated Nov. 10, 2021.
Application No. 19760240.2 Extended European Search Report dated Feb. 2, 2022.
Application No. 202027037244 First Examination Report dated Dec. 15, 2021.
U.S. Appl. No. 17/080,551 Office Action dated May 12, 2022.
U.S. Appl. No. 17/188,544 Office Action dated Jun. 27, 2022.
U.S. Appl. No. 17/080,580 Office Action dated May 26, 2022.
PCT Application No. PCT/US22224943 International Search Report and Written Opinion dated Jul. 28, 2022.
U.S. Appl. No. 17/207,679 Office Action dated Jul. 22, 2022.
U.S. Appl. No. 17/380,373 Office Action dated Aug. 5, 2022.

DISCOVERY AND DETECTION OF EVENTS IN INTERACTIVE CONTENT

CROSS-REFERENCE TO RELATED APPLICATION

The present application is a continuation and claims the priority benefit of U.S. patent application Ser. No. 15/908,712 filed Feb. 28, 2018, which is incorporated herein by reference in its entirety

BACKGROUND OF THE INVENTION

1. Field of the Invention

The present invention generally relates to interactive content. More specifically, the present invention relates to discovery and detection of events occurring during session play of interactive content.

2. Description of the Related Art

There are presently a wide variety of interactive digital content that are available to view through online outlets (e.g., Twitch). Within communities of such online content consumers, highly-skilled or otherwise notable players can achieve celebrity status and attract a large following. Similarly, various online digital games have also seen dramatic increases in popularity and attract an ever increasing number of participants and spectators alike.

Spectators may face difficulties, however, in discovering or identifying content of interest. A spectator of games may avail themselves of a stream from a variety of online media outlets. Such outlets may publish numerous games from numerous players (including players who are not participating in tournaments), however, making it difficult or at least inconvenient for the spectator to identify which games may be of interest. Such inconvenience risks loss of an interested audience of spectators.

The ability to attract, retain, and encourage repeat spectators is especially important to professional and semi-professional players whose gameplay may be sponsored. In addition to players who may be sponsored, commentators and other individuals who may seek to provide content related to tournaments may also face various difficulties in obtaining tournament data.

Particularly difficult for a spectator is identifying events of interest in close to real-time so as to be able to access the associated stream. For example, a particular game session may involve highly-skilled players on the verge of breaking all-time records. Spectators may wish to watch the actual record being broken in as close to real-time as possible. There is currently no way, however, for a spectator to know when such an event is about to occur unless they have knowledge of such records, are already watching, or are notified by friends who are currently watching. Word-of-mouth may not be particularly efficient or effective at informing a prospective spectator in time, however, and the prospective spectator may not be able to access the stream in real-time. In some instances, such delay may mean that the spectator may be "spoiled" as to the outcome or may be forced to wait for the stream to be archived and made available for access.

There is, therefore, a need in the art for improved systems and methods for discovery and detection of events occurring during play of interactive digital content.

SUMMARY OF THE CLAIMED INVENTION

Embodiments of the present invention allow for discovery and detection of events occurring during play of interactive digital content. A plurality of game titles may be hosted on a gaming network platform, and gameplay data in sessions involving the plurality of game titles may be tracked in real-time. Each session may be associated with a stream. One or more event criteria may be stored for each of a plurality of predefined events of interest. An event of interest may be identified when the tracked gameplay data for a session meets the stored criteria. A list of available streams identified as including the identified event may be sorted, and a subset of the available streams may be identified as being at a top of the list. A notification may be provided to a spectator device, the notification including a link to one of the streams in the subset. The criteria for the event of interest may also be updated based on subsequent game data and feedback (e.g., use of the link).

Various embodiments may include systems for discovery and detection of events occurring during play of interactive digital content. Such systems may include at least one game network server that hosts a plurality of game titles and tracks real-time gameplay data in sessions involving the plurality of game titles where each session is associated with a stream. Systems may further include at least one analytics server that stores one or more event criteria for each of a plurality of predefined events of interest, identifies an event when the tracked gameplay data for a session meets the stored criteria, sorts a list of available streams identified as including the identified event, identifies a subset of the available streams as being at a top of the list, and provides a notification to a spectator device that includes a link to one of the streams in the subset.

Further embodiments may include methods for discovery and detection of events occurring during play of interactive digital content. Such methods may include hosting a plurality of game titles, tracking real-time gameplay data in sessions involving the plurality of game titles where each session associated with a stream, storing one or more event criteria for each of a plurality of predefined events of interest, identifying an event when the tracked gameplay data for a session meets the stored criteria, sorting a list of available streams identified as including the identified event, identifying a subset of the available streams as being at a top of the list, and providing a notification to a spectator device that includes a link to one of the streams in the subset.

Yet further embodiments may include non-transitory computer-readable storage media having embodied thereon programs executable to perform such methods as described above.

DETAILED DESCRIPTION

Embodiments of the present invention allow for discovery and detection of events occurring during play of interactive digital content. A plurality of game titles may be hosted on a gaming network platform, and gameplay data in sessions involving the plurality of game titles may be tracked in real-time. Each session may be associated with a stream. One or more event criteria may be stored for each of a plurality of predefined events of interest. An event of interest may be identified when the tracked gameplay data for a session meets the stored criteria. A list of available streams identified as including the identified event may be sorted, and a subset of the available streams may be identified as being at a top of the list. A notification may be provided to a spectator device, the notification including a link to one of the streams in the subset. The criteria for the event of interest may also be updated based on subsequent game data and feedback (e.g., use of the link).

Figure 1:
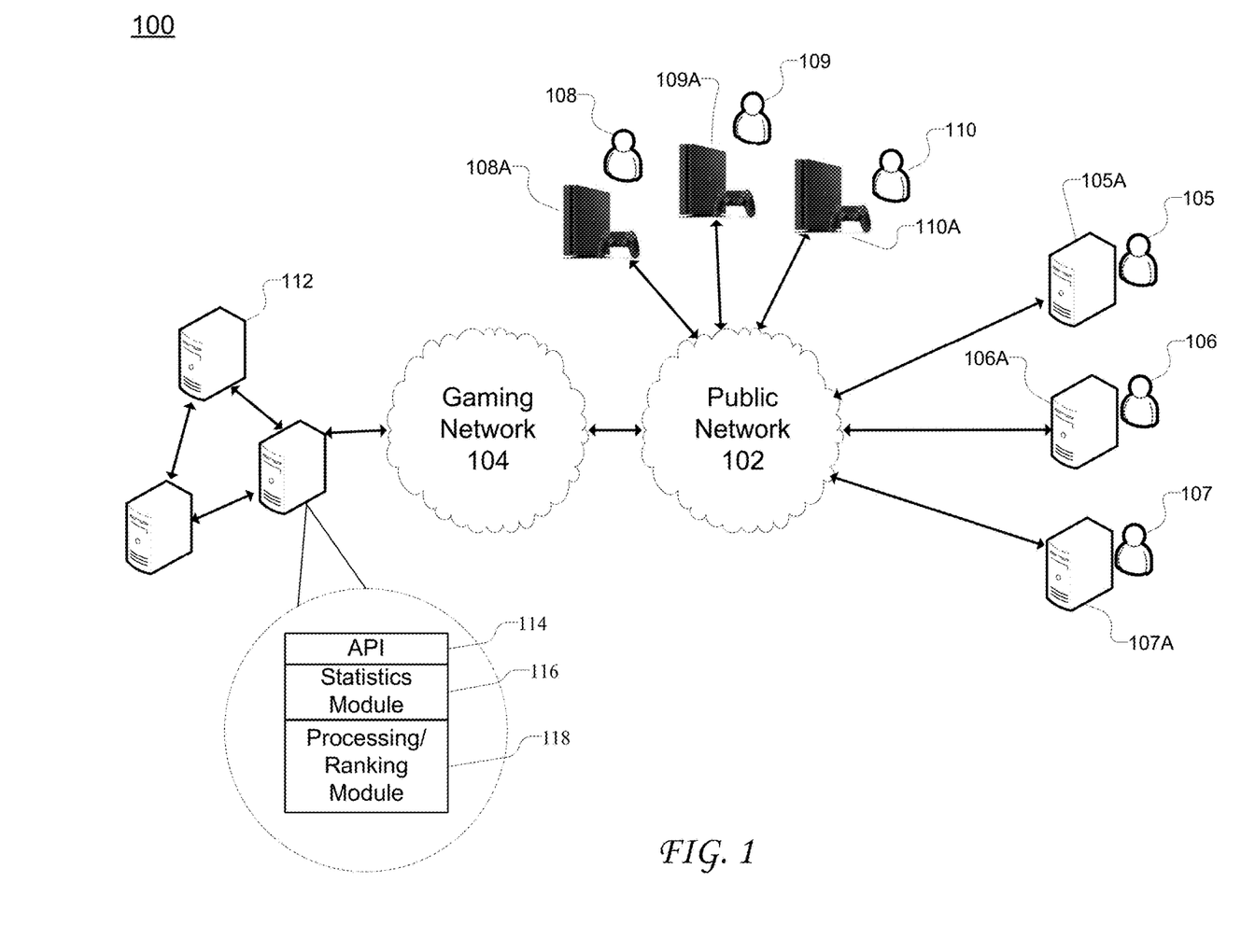
FIG. 1 an exemplary network environment in which systems for discovery and detection of events occurring during play of interactive digital content may be implemented.

FIG. 1 illustrates an exemplary network environment 100 in which a system for discovery and detection of events occurring during play of interactive digital content may be implemented. Network environment 100 includes public network 102, which can include one or more private networks, such as, a local area network (LAN), a wide area network (WAN), or a network of public/private networks, such as the Internet. The Internet is a broad network of interconnected computers and servers allowing for the transmission and exchange of Internet Protocol (IP) data between user devices connected through a network service provider. Examples of network service providers are the public switched telephone network, a cable service provider, a provider of digital subscriber line (DSL) services, or a satellite service provider. Public network 102 allows for communication between the various components of network environment 100. Public network 102 is communicatively coupled to gaming network 104, which may further provide a network of computing resources configured for implementing event detection system 112.

Spectators may include players 108-110, who may access gaming network 104 and event detection system 112 using their respective client devices (e.g., 108A-110A). Although client devices 108A-110A, are depicted as game console devices, it is understood that the client devices can include various types of processor-based systems, including but not limited to: personal computing devices, smartphones, tablets, other portable gaming devices, and the like. Such client devices 108A-110A may also be configured to access data from other storage media, such as memory cards or disk drives as may be appropriate in the case of downloaded services. Client devices 108A-110A may include standard hardware computing components such as network and media interfaces, non-transitory computer-readable storage (memory), and processors for executing instructions that may be stored in memory. Example of hardware systems that can be used to implement the client device are discussed in further detail below with respect to FIG. 4.

Spectators may also include developers or other parties (e.g., 105-107), who may also access gaming network 104 and event detection system 112 via their respective computing systems (e.g., 105A-107A). Developer computing systems 105A-107A may include any type of server or other computing device as is known in the art, including standard hardware computing components such as network and media interfaces, non-transitory computer-readable storage (memory), and processors for executing instructions or accessing information that may be stored in memory. The functionalities of multiple servers may be integrated into a single server. Any of the aforementioned servers (or an integrated server) may take on certain client-side, cache, or proxy server characteristics. These characteristics may depend on the particular network placement of the server or certain configurations of the server. It is understood that a greater (or fewer) number of players and/or developers can be engaged with environment 100, without departing from the scope of the disclosed technology.

The players 108-110 may be registered with a user account associated with gaming network 104. Such user accounts may allow the user to access and play a variety of media titles on the gaming network platform. Gaming network 104 may further provides its registered users with options for verified accounts (e.g., for professional, semi-pro, or other celebrity users), team management, community tools, events tracking, social tools (e.g., friends lists), following other accounts, instant messaging, browsing live and archived streams, and other features related to playing or spectating games on the platform.

Gaming network 104 may be integrated with event detection system 112 so as to allow for automatic communication of gameplay data. The gameplay data can be received by event detection system 112, for example, using an application programming interface (API), such as API 114. Subsequently, the gameplay data can be passed from API 114 to statistics module 116 for use in analysis. In a similar manner, game-play statistics can be collected by API 114 and passed to statistics module 116. Depending on implementation, gameplay statistics can be collected via active monitoring of an online game environment, or received from one or more external systems, for example, as part of a game performance data set that includes information describing individual player performance for one or more game titles and/or genre categories.

Because the metrics that are used to evaluate player performance for a particular game can vary widely between game title and type, the ability to rank and seed players require consideration of certain metrics. Such metrics may be converted from data generated in existing game titles or may be tracked at the platform during certain specified gameplay modes.

To convert a legacy game title, a conversion key—provided by the game title developer or another party—may be applied to specific game-performance attributes so as to evaluate different players' performance relating to the game title in a standardized way. For example, the conversion key may extract and evaluate certain metrics (e.g., number of points scored, number of points allowed, number of kills, race times) with appropriate weights applied to each metric. Legacy game titles that rank each user using basic points-based systems may be mapped directly via percentiles of the ranked players. Certain predefined in-game events of interest may be correlated to a set of game data indicative of the same. Such correlation may be provided by the developer, another party, or may be derived by applying artificial intelligence to a set of game data associated with the game title.

Such standardization further allows for an objective comparison of skill level, which may provide a basis for rankings. Different genres of games—and different roles within each game—may involve different standards. Team-based gameplay, for example, may involve teammates with different types of skill sets (e.g., different weaponry, resources, in-game abilities, powers, etc.). As such, the game play of different team members may be evaluated in accordance with the different standards despite playing in the same game title.

Designations of achievement or skill level can be provided based on the overall ranking of a player or group of players. For example, digital badges, trophies, or medals can be provided to the top-ranked player (or player team), and published on an associated player (or team) profile. Such designations may be awarded as to a current season and remain visible in future seasons. Different designations may be provided for different game titles, different combinations of achievements, overall ratings, etc. Not only can such designations and tier levels serve as the basis for matching competitors, but such indicators may be searched by spectators looking to watch players of a certain level in a certain game title. Various search and sorting options may be provided (e.g., game title, ranking, stream parameters) so that players or potential spectators may filter through the available game streams, players, teams, tournaments, etc. to find other players of interest. A player may wish to find a similarly-skilled practice sparring partner, for example, or a teammate with complementary skills. Such spectators may choose to follow such players, for example, and request notifications, reminders, and schedules relating to matches involving the player(s) of interest. In some embodiments, such designations may be made available through other outlets (e.g., stream sources such as Twitch) for searching and filtering based on a standardized skill evaluation system.

Different ranking systems may be available for different game titles. Moreover, different ranking systems may be available for tournaments. A tournament may involve multiple game titles, for example, and as such, a ranking system may combine and/or weight different individual rankings within the game titles in a manner that may be customized to individual spectators or for certain audiences. An overall ranking for any combination of games played on the platform may also be available. As such, a player may distinguish themselves as a skilled player not only in one or a few game titles (or even a game family or genre), but within multiple different types of games.

Such rankings may be considered by various spectator tools provided to enable users to discover, tune in, watch, and interact in relation to the tournament. Discovery may involve providing certain kinds of information (e.g., from player or team profiles) so that a would-be spectator may determine whether a player, team, match, tournament, commentator, or other content producer/streamer may be of interest. A spectator—who may have their own user account—may further subscribe or follow a player, team, game title, or tournament of interest. Such a subscriber may therefore be provided with automatic notifications based on certain events or activities (e.g., scores, lead changes, game results, standings after each round, updated brackets) detected on the platform as being related to the subject of interest.

The event detection system 112 may further provide a way for spectators having access (e.g., via a user account) to the gaming network platform 104 to discover digital content of interest based on detected events. Because the registering spectator may already have a user account, such discovery and detection may be based on user account information linked or otherwise accessed via gaming network 104, which may also server as bases for broadcast/stream production. A user account may be associated with a group of friends (or fans, followers, or subscribers), for example, which may be a basis for making recommendations, organizing spectator watch parties, or supporting interaction around spectating. For game titles that may be played in teams, a team may be associated with a team account or profile that includes such data for use by event detection system 112. Such a team profile may be linked to the individual team member profiles.

Information regarding each individual player's or team's progress or activities within gaming network 104 may be automatically populated to the respective player or team profile. For example, a player profile may be tagged or include some other indicator that the player is participating in a particular game, what ranking the player has achieved, schedule of games, opponents (and associated rankings), real-time game data related to the player, links to streams of previously played games, links to active games, information regarding future scheduled games (e.g., in tournament-style play), etc.

Moreover, a spectator looking to observe a particular player may be linked to information regarding tournament streams involving the player of interest, as well as other tournament information regarding the player. In addition, a spectator looking specifically to observe tournament matches may be linked to active tournament streams of ongoing matches, as well as be provided with the latest updates regarding the tournament.

In addition to spectators with express interests (e.g., survey results, user account information, preferences, subscriptions within the gaming network platform 104), event detection system 112 may further make predictions as to what digital content may be of interest to a particular spectator. In addition, events taking place within the digital environment may be identified as being of interest.

Moreover, because the event detection system 112 is in communication with gaming network 104, the event detection system 112 may receive and analyze game data in real-time. As such, event detection system 112 may detect when a game has started, when the game is particularly active or competitive, and other notable in-game events. For example, certain in-game events may be associated with certain game data or metrics. Use of certain weaponry, exhibition of certain character moves or maneuvers, scoring in a certain amount or pattern, etc., may be indicative of an unusual or otherwise notable in-game event.

Event detection system 112 may apply elements of artificial intelligence and machine learning to game data obtained via gaming network 104. As each game is played, additional game data may be added to the learning set to refine the ability of event detection system 112 to identify digital content that may be of interest to a particular spectator. Such game data may include not only in-game statistics that are expressly captured by the game title (e.g., scores), but may further include metrics that may be derived based on various analytics. In addition, event detection system 112 may consider data associated with but external to the game. For example, such data may include sensor data (including accelerometer), biometric data, camera data, eye tracking data, comparisons to historical or opponent data, Easter eggs, rarity or unusual nature of data (e.g., location in rarely-visited parts of the game environment, encounters with rarely-met characters, obtaining rare objects or powers), current audience data (and their respective user profiles), etc.

Certain indicators may be known to be associated with events of interest, either to a particular spectator or generally. Such indicators may include degree of fame or connectedness of the player/team, current audience size (e.g., general or among a spectator's social circle) and growth, amount of sharing or other activity related to the game, rank or record of player/team, excited gestures or actions (as captured by cameras) by players or current audience members, excited chatter in chatrooms or other types of message boards (e.g., hosted by gaming network 104), excited utterances (as captured by microphones), biometric indicators (e.g., elevated heartrate, dilated pupils) by player/team or spectators, immediacy of winning, losing, or breaking certain game records (e.g., highest score in a game title on gaming network 104), unusual moves or maneuvers or exercises of powers, size of disparities in rank (e.g., upset of highly ranked player/team by low-ranked player/team). Such factors may be evaluated with respect to the timing of the game to identify time periods during which a cluster of such factors may be concentrated. Further, certain data may be weighted and their weights adjusted over time as the learning data set evolves.

Upon detection of an event of interest, screenshots or video may be captured regarding such events and published with links that can take a spectator to the stream, whether at the beginning of the game or directly to the point of interest. Such links may be accessed in real-time (e.g., as the game is occurring) or in association with an archived stream. In some embodiments, such links may be published on the gaming network 104 platform (e.g., landing pages, leaderboards, communities, forums, user profiles, team profiles, tournament profiles, bookmarks) or on sites associated with the player, team, developer, broadcaster, other content producer or streamer, or other spectator.

The identification of unusual, interesting, or otherwise significant events may also allow for advertising, promotion, discovery, and related functions. As such, notifications, reminders, video clips, screenshots, and other data may also be generated and provided to other parties, players, spectators, and potential spectators in real-time regarding such events. Such data may also support commentators and third-party broadcasters/streamers for use in producing their respective content streams.

The events identified within a game session may be further flagged, tagged, or otherwise labeled and made available for both current and archived streams of game play. Moreover, such event identifications may also be used to augment streams provided to general audiences or specific spectators. Such augmentation may include pop-up notifications regarding a variety of statistics, quotes from commentary or other discussion, back story of player/team/opponents, smack talk, links, comparison to historical or other player/team records, immediacy of breaking a record, comparison to spectator's statistics, etc. Records considered may be all-time records on the gaming network 104, game title records, personal records, tournament records, etc. Such flags may also be subsequently used to identify trends (e.g., a player's improvement), turning points, or other long-term developments. As such, the flags may be updated and refined as well over time.

In addition, views of the current or archived stream may be manipulated or re-rendered based on the detected event. Certain in-game perspectives (e.g., a select player in a multiplayer game) may be highlighted, for example, or re-rendered with certain visual effects, including slow-motion, from different angles, different view styles, time-slice effects, etc. In some embodiments, certain stream producers may modify streams for broadcast, which may include visual manipulations and editing. The data regarding such modifications may be added to the learning set so that event detection system 112 may learn what types of events may be of more interest than others, view perspectives or angles that may be more popular for certain events, types of visual effects or manipulations often applied to certain events, etc.

Figure 2:
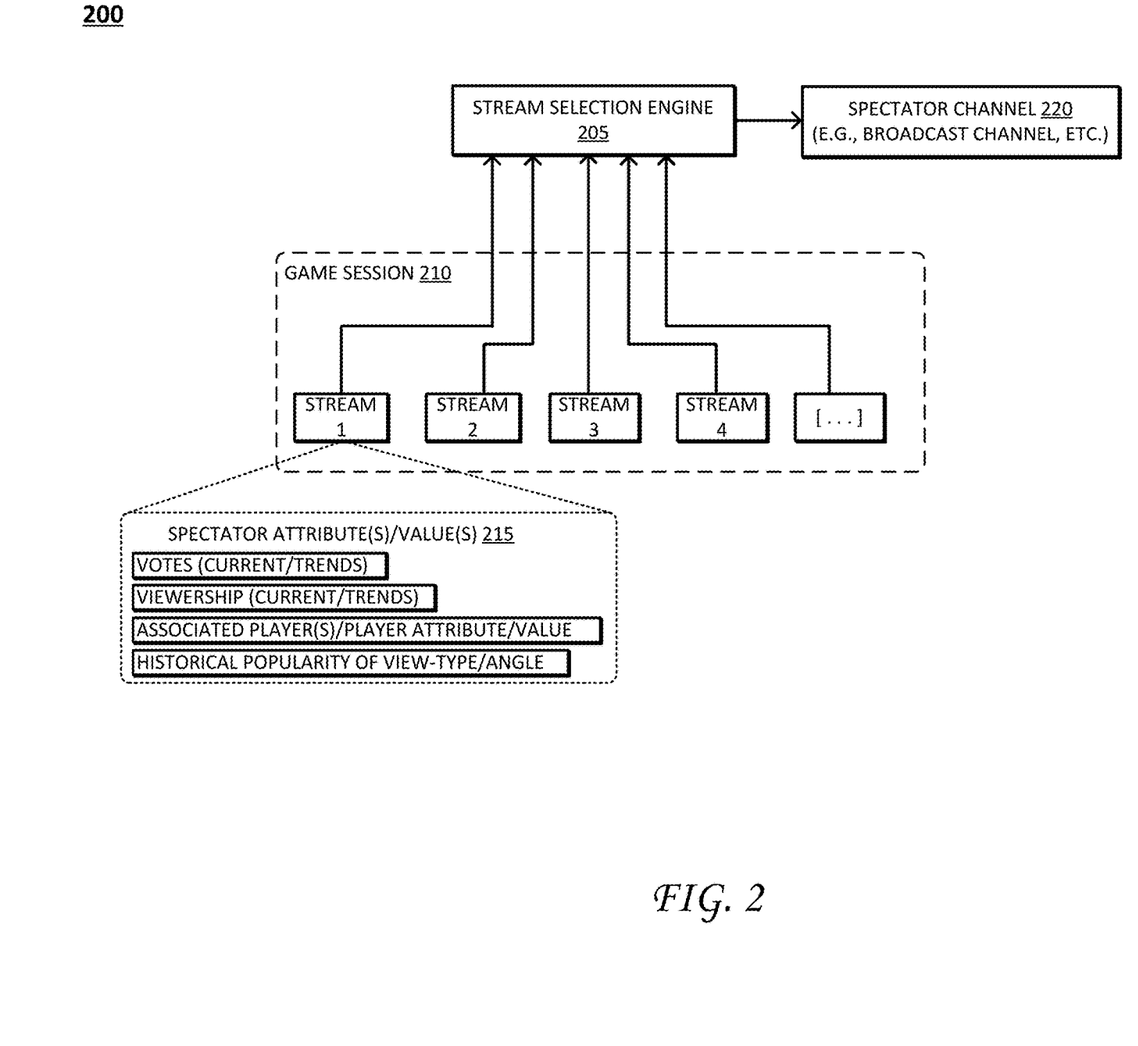
FIG. 2 is a block diagram of an exemplary stream selection engine that may be used in systems for discovery and detection of events occurring during play of interactive digital content.

FIG. 2 is a block diagram of an exemplary stream selection engine that may be used in systems for discovery and detection of events occurring during play of interactive digital content. As shown, stream selection engine 205 monitors multiple media streams associated with game session 210 and selects the streams involving the events of interest from popular angles or views. Here, the media streams associated with game session 210 include stream 1, stream 2, stream 3, and stream 4 (e.g., different player perspectives in a multiplayer game) and represent display content or views of live game play in game session 210. The display content can, for example, include individual player views (e.g., first-person perspective views, third-person perspective views, etc.), top-down views, birds-eye views, two-dimensional (2D) views, ¾ views, fixed three-dimensional (3D) views, omnidirectional views, god's-eye views, and other views showing live game play for game session 210.

Stream selection engine 205 further assigns one or more spectator attributes 215 to respective media streams, where each spectator attribute 215 has a corresponding spectator value. Spectator attributes 215 may include any of the factors discussed above, including, for example, user votes, viewership (generally or among friends/followers), associated players or associated player attribute, a historical popularity of a view-type or view angle, and the like. As discussed herein, the terms "spectator attribute" and/or "spectator value" are used synonymously, and generally correspond to an interest, popularity, or preference for respective media streams. The spectator value can reflect a current preference or popularity or it can reflect a trend such as changes or derivatives of the current preferences for a given time period. Generally, higher or larger spectator values represent a stronger preference; however any value system may be used, as is appreciated by those skilled in the art.

In operation, stream selection engine 205 monitors media streams 1-4 and continuously updates respective spectator attributes/values 215 during live game play in game session 210 based, in part, on current user inputs. With respect to user inputs, the multi-user platform and/or stream selection engine 205 provide a user input interface that includes interactive graphical elements to solicit and receive input from current spectators during the live game play. Examples of spectator inputs that indicate interest or preference in a particular media stream include votes, viewership, or other indications of preference for the media stream. As discussed below, one or more of these spectator attributes may be considered independently or in combination with other spectator attributes. Further, certain spectator values/attributes represent a weight that applies to other spectator values/attributes, as is appreciated by those skilled in the art. Such spectator inputs (from current spectators) may be compared to user data associated with prospective spectators in determining whether an event occurring during the gameplay session may be of interest.

Still referring to FIG. 2, stream selection engine 205 compares individual or aggregated spectator values for respective media streams during live game play and determines a priority ranking for each media stream in a given time period of live game play. Stream selection engine 205, as discussed, continuously updates respective spectator values 215 during live game play based on current user inputs and further compares or ranks spectator values for corresponding media streams to determine user preferences for viewing one media stream over another media stream. Stream selection engine 205 further designates one of the media streams to broadcast for a given time period based on its then-current priority rank. The media stream designated for the given time period is further broadcast in a spectator channel 220 over the network. As shown, spectator channel 320 represents an integration of portions of each designated media stream (for the given time period). Stream selection engine 205 stitches or compiles the portions of currently designated media streams into spectator channel 220. Throughout game session 210, stream selection engine 205 switches between media streams 1-4 based on the priority rank for respective media streams in a given time period. In this fashion, spectator channel 220 provides user-preferred media content that shows different views of live game play during game session 210. Generally, a single media stream is designated to broadcast per given time period. However, it is also appreciated more than one media stream may be broadcast per given time period.

Figure 3:
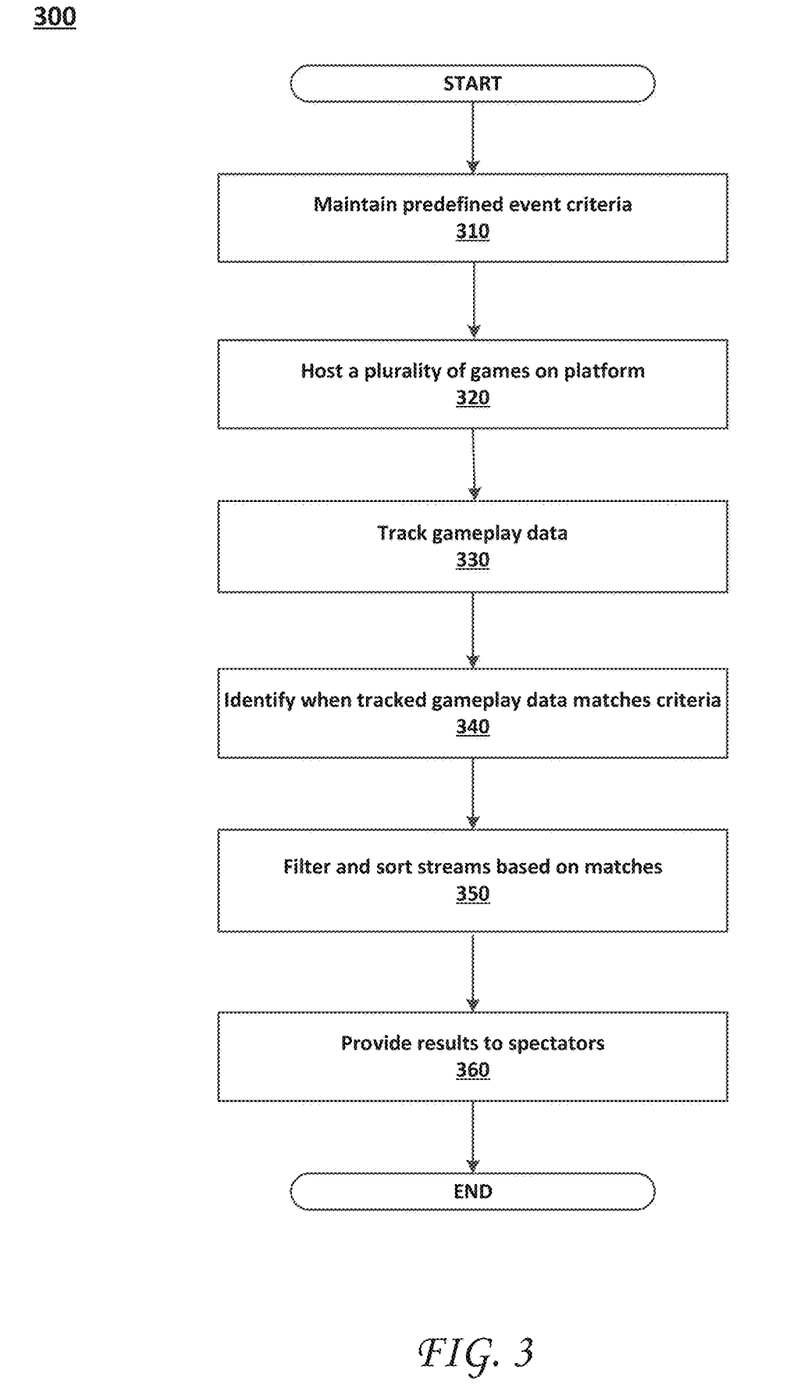
FIG. 3 is a flowchart illustrating an exemplary method for discovery and detection of events during play of interactive digital content.

FIG. 3 is a flowchart illustrating an exemplary method 300 for discovery and detection of events in interactive digital content. The method 300 of FIG. 3 may be embodied as executable instructions in a non-transitory computer readable storage medium including but not limited to a CD, DVD, or non-volatile memory such as a hard drive. The instructions of the storage medium may be executed by a processor (or processors) to cause various hardware components of a computing device hosting or otherwise accessing the storage medium to effectuate the method. The steps identified in FIG. 3 (and the order thereof) are exemplary and may include various alternatives, equivalents, or derivations thereof including but not limited to the order of execution of the same.

In method 300 of FIG. 3, predefined event criteria may be maintained for each spectator, a plurality of games may be hosted on the gaming platform, gameplay data for each game session may be tracked, matches between the criteria and the tracked gameplay data may be identified, and streams may be filtered and sorted based on such matches. Further, the filtered and sorted results may be provided to a prospective spectator.

In step 310, predefined criteria may be maintained in memory for certain in-game events. Some game events may already defined within a game, such as scores. Other game events may be notable based on such external information as historical records for the game, fame or celebrity of the player/team, rarity, or strength of current audience reaction. Some factors may be specific to the spectator. For example, a record that is on the verge of being broken may have belonged to a prospective spectator. Or the player who is on the verge of breaking the record may be a friend of the spectator. Such factors may also be associated with certain weights that are specific to the spectator.

In addition, certain conditions may be identified as being common to events known to be of interest (e.g., from archived streams of sessions that have ended). For example, trends may be identified with respect to audience growth over the course of the session, as well as amount and patterns of activity related to the same. Sharing patterns by current audience members, for example, may be indicative that a particularly notable event may be occurring.

In step 320, multiple games may be hosted on the gaming network 104 platform involving gameplay by any number of players or teams. Game sessions may involve different game titles that are available on gaming network 104.

In step 330, data may be tracked regarding each game session in real-time. Such data may include not only in-game gameplay data, but also analytics and metrics based on the same, spectator data, and external data regarding the player/team. Such games or matches are being played on the gaming network 104 platform by players/teams with account or profiles and watched by spectators with profiles.

In step 340, certain events may be identified within a game session that match the predefined event criteria. As noted above, event detection system 112 may evaluate the respective gameplay data and other data associated with the session in real-time to identify noteworthy in-game events, which may not only include scores or lead changes, but also unusual movement combinations, notable speeds, notable kills, game upsets by underdogs, broken records, etc.

In step 350, the available streams may be filtered and sorted in accordance with the matches identified in step 340. In some instances, the available streams may include archived but unwatched streams, as well as live streams. As noted above, different weighting systems may be used to find the streams most likely to be of interest to the spectator.

In step 360, the filtered and sorted results (e.g., a list of streams) may be displayed to the requesting party. The bases for such filtering and sorting—which may be associated with the notability designations discussed herein—may also be displayed in conjunction with the results, thereby allowing the party (e.g., spectator) to jump not only to a stream of interest, but directly to the notable event depicted within the stream.

Figure 4:
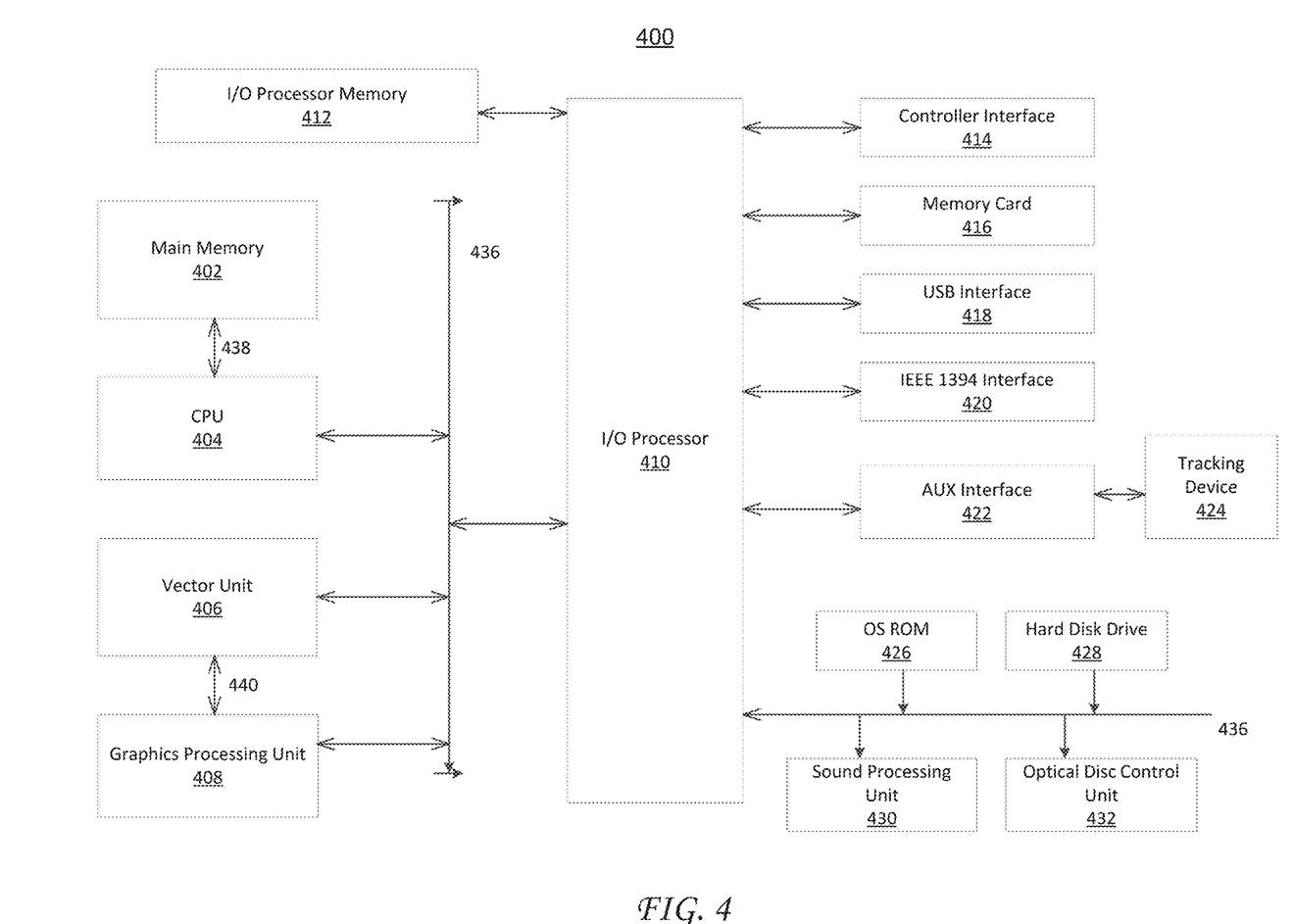
FIG. 4 illustrates an example of an electronic system with which some aspects of the subject technology can be implemented.

FIG. 4 is an exemplary user device 400. User device 400 (e.g., desktop, laptop, tablet, mobile device, console gaming system) is a device that the user can utilize to facilitate carrying out features of the present invention pertaining to the viewing of third party content.

The user device 400 may include various elements as illustrated in FIG. 4. It should be noted that the elements are exemplary and that other embodiments may incorporate more or less than the elements illustrated. With reference to FIG. 4, the user device 400 includes a main memory 402, a central processing unit (CPU) 404, at least one vector unit 406, a graphics processing unit 408, an input/output (I/O) processor 410, an I/O processor memory 412, a controller interface 414, a memory card 416, a Universal Serial Bus (USB) interface 418, and an IEEE 1394 interface 420, an auxiliary (AUX) interface 422 for connecting a tracking device 424, although other bus standards and interfaces may be utilized. The user device 400 further includes an operating system read-only memory (OS ROM) 426, a sound processing unit 428, an optical disc control unit 430, and a hard disc drive 432, which are connected via a bus 434 to the I/O processor 410. The user device 400 further includes at least one tracking device 424.

The tracking device 424 may be a camera, which includes eye-tracking capabilities. The camera may be integrated into or attached as a peripheral device to user device 400. In typical eye-tracking devices, infrared non-collimated light is reflected from the eye and sensed by a camera or optical sensor. The information is then analyzed to extract eye rotation from changes in reflections. Camera-based trackers focus on one or both eyes and record their movement as the viewer looks at some type of stimulus. Camera-based eye trackers use the center of the pupil and light to create corneal reflections (CRs). The vector between the pupil center and the CR can be used to compute the point of regard on surface or the gaze direction. A simple calibration procedure of the viewer is usually needed before using the eye tracker.

Alternatively, more sensitive trackers use reflections from the front of the cornea and that back of the lens of the eye as features to track over time. Even more sensitive trackers image features from inside the eye, including retinal blood vessels, and follow these features as the eye rotates.

Most eye tracking devices use a sampling rate of at least 30 Hz, although 50/60 Hz is most common. Some tracking devises run as high as 1250 Hz, which is needed to capture detail of very rapid eye movement.

A range camera may instead be used with the present invention to capture gestures made by the user and is capable of facial recognition. A range camera is typically used to capture and interpret specific gestures, which allows a hands-free control of an entertainment system. This technology may use an infrared projector, a camera, a depth sensor, and a microchip to track the movement of objects and individuals in three dimensions. This user device may also employ a variant of image-based three-dimensional reconstruction.

The tracking device 424 may include a microphone integrated into or attached as a peripheral device to user device 400 that captures voice data. The microphone may conduct acoustic source localization and/or ambient noise suppression.

Alternatively, tracking device 424 may be the controller of the user device 400. The controller may use a combination of built-in accelerometers and infrared detection to sense its position in 3D space when pointed at the LEDs in a sensor nearby, attached to, or integrated into the console of the entertainment system. This design allows users to control functionalities of the user device 400 with physical gestures as well as button-presses. The controller connects to the user device 400 using wireless technology that allows data exchange over short distances (e.g., 30 feet). The controller may additionally include a "rumble" feature (i.e., a shaking of the controller during certain points in the game) and/or an internal speaker.

The controller may additionally or alternatively be designed to capture biometric readings using sensors in the remote to record data including, for example, skin moisture, heart rhythm, and muscle movement.

As noted above, the user device 400 may be an electronic gaming console. Alternatively, the user device 400 may be implemented as a general-purpose computer, a set-top box, or a hand-held gaming device. Further, similar user devices may contain more or less operating components.

CPU 404, vector unit 406, graphics processing unit 408, and I/O processor 410 communicate via system bus 436. Further, the CPU 404 communicates with the main memory 402 via a dedicated bus 438, while the vector unit 406 and the graphics processing unit 408 may communicate through a dedicated bus 440. The CPU 404 executes programs stored in the OS ROM 426 and the main memory 402. The main memory 402 may contain pre-stored programs and programs transferred through the I/O Processor 410 from a CD-ROM, DVD-ROM, or other optical disc (not shown) using the optical disc control unit 432. The I/O processor 410 primarily controls data exchanges between the various devices of the user device 400 including the CPU 404, the vector unit 406, the graphics processing unit 408, and the controller interface 414.

The graphics processing unit 408 executes graphics instructions received from the CPU 404 and the vector unit 406 to produce images for display on a display device (not shown). For example, the vector unit 406 may transform objects from three-dimensional coordinates to two-dimensional coordinates, and send the two-dimensional coordinates to the graphics processing unit 408. Furthermore, the sound processing unit 430 executes instructions to produce sound signals that are outputted to an audio device such as speakers (not shown).

A user of the user device 400 provides instructions via the controller interface 414 to the CPU 404. For example, the user may instruct the CPU 404 to store certain information on the memory card 416 or instruct the user device 400 to perform some specified action.

Other devices may be connected to the user device 400 via the USB interface 418, the IEEE 1394 interface 420, and the AUX interface 422. Specifically, a tracking device 424, including a camera or a sensor may be connected to the user device 400 via the AUX interface 422, while a controller may be connected via the USB interface 418.

The present invention may be implemented in an application that may be operable using a variety of devices. Non-transitory computer-readable storage media refer to any medium or media that participate in providing instructions to a central processing unit (CPU) for execution. Such media can take many forms, including, but not limited to, non-volatile and volatile media such as optical or magnetic disks and dynamic memory, respectively. Common forms of non-transitory computer-readable media include, for example, a floppy disk, a flexible disk, a hard disk, magnetic tape, any other magnetic medium, a CD-ROM disk, digital video disk (DVD), any other optical medium, RAM, PROM, EPROM, a FLASHEPROM, and any other memory chip or cartridge.

Various forms of transmission media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU. Various forms of storage may likewise be implemented as well as the necessary network interfaces and network topologies to implement the same.

The foregoing detailed description of the technology has been presented for purposes of illustration and description. It is not intended to be exhaustive or to limit the technology to the precise form disclosed. Many modifications and variations are possible in light of the above teaching. The described embodiments were chosen in order to best explain the principles of the technology, its practical application, and to enable others skilled in the art to utilize the technology in various embodiments and with various modifications as are suited to the particular use contemplated. It is intended that the scope of the technology be defined by the claim.

What is claimed is:

1. A method for augmenting in-stream events, the method comprising:

tracking information regarding a plurality of streams;

storing event criteria for one or more predefined events of interest;

identifying that statistics corresponding to data from one or more external sources are associated with one or more of the streams, wherein at least one set of the statistics is identified as associated with an identified time period within at least one of the streams during which a cluster of factors are concentrated;

defining an event at the identified time period during which the cluster of factors are concentrated within the at least one stream based on the at least one set of statistics for the identified time period meeting the stored event criteria; and modifying one or more views of the defined event within the at least one stream, wherein modifying the views includes augmenting the at least one stream in accordance with the data from the external sources associated with the at least one set of statistics.

2. The method of claim 1, wherein the at least one stream is accessible via a link, wherein the link is associated with a screenshot or video corresponding to one of the modified views of the event.

3. The method of claim 2, further comprising sending the link over a communication network to a user device, wherein the link is selectable to access the at least one stream from a stream source in real-time or from an archive.

4. The method of claim 1, wherein data from the external sources includes information indicative of gameplay performance within one or more game titles or genre categories.

5. The method of claim 1, wherein the data from the external sources includes at least one of sensor data, biometric data, camera data, eye tracking data, historical data, opponent data, current audience data and unusual data.

6. The method of claim 5, wherein the unusual data corresponds to a specified rarity within a game title and includes at least one of unusual in-game locations, unusual characters, and unusual objects.

7. The method of claim 1, wherein modifying the one or more views of the event further includes highlighting one or more in-game perspectives or re-rendering with one or more visual effects.

8. The method of claim 1, further comprising adding the data from the one or more external sources and the modified views to a learning set of an artificial intelligence learning system that refines identification of the events of interest, the learning set updated over time.

9. The method of claim 8, further comprising weighting the data in the learning set, and adjusting the weighting over time.

10. A system for augmenting in-stream events, the system comprising:
a communication interface that receives tracked information regarding a plurality of streams; and
memory that stores event criteria for one or more predefined events of interest; and a processor that executes instructions stored in memory, wherein the processor executes the instructions to:
identify that statistics corresponding to data from one or more external sources are associated with one or more of the streams, wherein at least one set of the statistics is identified as associated with an identified time period during which a cluster of factors are concentrated within at least one of the streams;
define an event at the identified time period during which the cluster of factors are concentrated within the at least one stream based on the at least one set of statistics for the identified time period meeting the stored event criteria; and
modify one or more views of the defined event within the at least one stream, wherein modifying the views includes augmenting the identified stream in accordance with the data from the external sources associated with the at least one set of statistics.

11. The system of claim 10, wherein the at least one stream is accessible via a link, wherein the link is associated with a screenshot or video corresponding to one of the modified views of the event.

12. The system of claim 11, wherein the communication interface further sends the link over a communication network to a user device, wherein the link is selectable to access the at least one stream from a stream source in real-time or from an archive.

13. The system of claim 10, wherein data from the external sources includes information indicative of gameplay performance within one or more game titles or genre categories.

14. The system of claim 10, wherein the data from the external sources includes at least one of sensor data, biometric data, camera data, eye tracking data, historical data, opponent data, current audience data and unusual data.

15. The system of claim 14, wherein the unusual data corresponds to a specified rarity within a game title and includes at least one of unusual in-game locations, unusual characters, and unusual objects.

16. The system of claim 10, wherein the processor modifies the one or more views of the event further by highlighting one or more in-game perspectives or re-rendering with one or more visual effects.

17. The system of claim 10, wherein the memory further stores a learning set of an artificial intelligence learning system that refines identification of the events of interest, and wherein the data from the one or more external sources and the modified views is added to the learning set, the learning set updated over time.

18. The system of claim 17, wherein the processor executes further instructions to weight the data in the learning set and to adjust the weighting over time.

19. A non-transitory computer-readable storage medium, having embodied thereon a program executable by a processor to perform a method for augmenting in-stream events, the method comprising:
tracking information regarding a plurality of streams;
storing event criteria for one or more predefined events of interest;
identifying that statistics corresponding to data from one or more external sources are associated with one or more of the streams, wherein at least one set of the statistics is identified as associated with an identified time period within at least one of the streams during which a cluster of factors are concentrated;
defining an event at the identified time period during which the cluster of factors are concentrated within the at least one stream based on the at least one set of statistics for the identified time period meeting the stored event criteria; and
modifying one or more views of the defined event within the at least one stream, wherein modifying the views includes augmenting the at least one stream in accordance with the data from the external sources associated with the at least one set of statistics.

* * * * *